(12) United States Patent
Rao et al.

(10) Patent No.: US 9,972,897 B1
(45) Date of Patent: May 15, 2018

(54) L-BAND ARRAY ELEMENT WITH INTEGRATED TRIPLEXER FOR GPS PAYLOADS

(71) Applicants: NORTHROP GRUMMAN SYSTEMS CORPORATION, Falls Church, VA (US); CUSTOM MICROWAVE INC., Longmont, CO (US)

(72) Inventors: Sudhakar K. Rao, Rancho Palos Verdes, CA (US); Clency Lee-Yow, Longmont, CO (US); Philip E. Venezia, Longmont, CO (US); Jonathan R. Scupin, Longmont, CO (US)

(73) Assignees: Northrop Grumman Systems Corporation, Falls Church, VA (US); Custom Microwave Inc., Longmont, CO (US)

( * ) Notice: Subject to any disclaimer, the term of this patent is extended or adjusted under 35 U.S.C. 154(b) by 0 days. days.

(21) Appl. No.: 15/672,673

(22) Filed: Aug. 9, 2017

(51) Int. Cl.
*H01Q 1/28* (2006.01)
*H01Q 21/00* (2006.01)
*G01S 19/02* (2010.01)
*H01Q 3/26* (2006.01)

(52) U.S. Cl.
CPC ............ *H01Q 1/288* (2013.01); *G01S 19/02* (2013.01); *H01Q 21/0056* (2013.01); *H01Q 3/2623* (2013.01); *H01Q 3/2658* (2013.01)

(58) Field of Classification Search
CPC .................................................... H01Q 1/288
See application file for complete search history.

*Primary Examiner* — Graham Smith
(74) *Attorney, Agent, or Firm* — John A. Miller; Shumaker, Loop & Kendrick, LLP

(57) ABSTRACT

A phased array antenna including a plurality of antenna element units mounted to a panel having a first side and a second side. Each antenna unit includes a step aperture integrated radiating (STAIR) antenna element mounted to the first side of the panel and having an outer cylindrical waveguide, a septum polarizer including a plurality of steps and a septum feed structure, and a right hand circularly polarized (RHCP) feed structure electrically coupled to the septum feed structure. Each antenna unit further includes a triplexer module mounted to the second side of the panel and being responsive to a plurality of linearly polarized signals to be transmitted by the STAIR element, where the triplexer module operates to combine the plurality of linearly polarized signals and provide the combined signal to the RHCP feed structure to be converted by the septum polarizer to a circularly polarized signal for transmission.

23 Claims, 5 Drawing Sheets

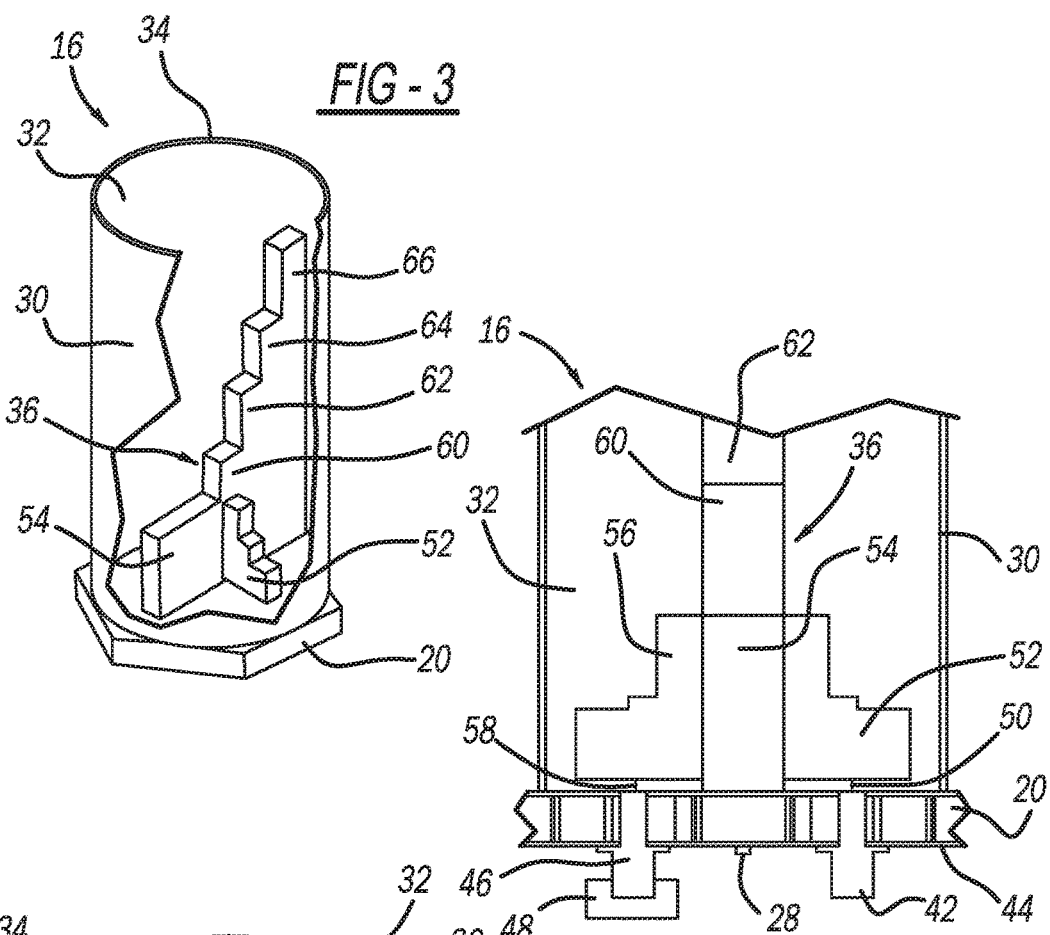
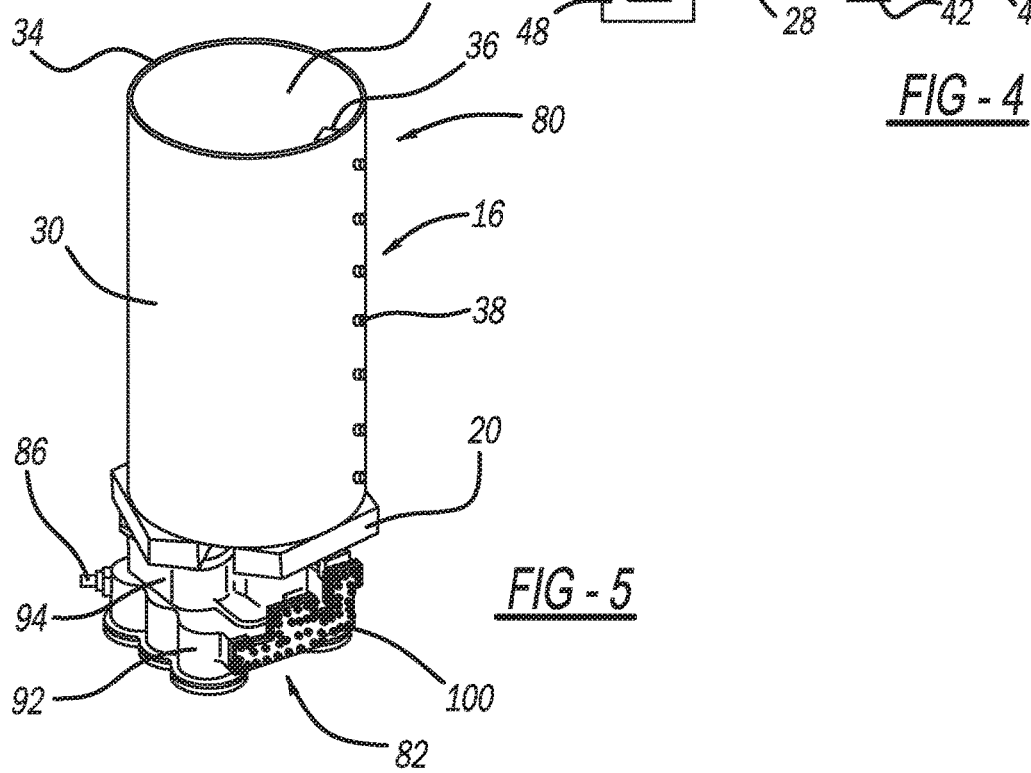

US 9,972,897 B1

L-BAND ARRAY ELEMENT WITH INTEGRATED TRIPLEXER FOR GPS PAYLOADS

BACKGROUND

Field

This invention relates generally to an antenna element for a phased array antenna and, more particularly, to a phased array antenna for a GPS satellite, where the array includes a plurality of L-band antenna elements each employing a septum polarizer that is integrated with a triplexer to provide high resolution on the ground and with minimal weight.

Discussion

Various global navigation satellite systems (GNSSs) are in operation that employ a constellation of communications satellites orbiting the Earth, typically in medium Earth orbit (MEO), that transmit signals at a certain frequency band that are received by a receiver on the ground, on water or in the air, where the signals received by the receiver from four or more of the satellites allows the receiver to identify its position within a certain amount of accuracy. These GNSSs serve billions of military, civil and commercial users around the world, and have become an important part of everyday life. Examples of known GNSSs include the United States global positioning system (GPS), the Russian global navigational satellite system (GLONASS), the European Union Galileo navigational system, as well as others.

A typical GNSS satellite will include a phased array antenna having a certain number of antenna elements operating at specific allotted frequency bands and having a specific polarization sense for the RF signals. For example, GPS satellites employ phased array antennas operating in the L-band, i.e., 1000-2000 MHz, and specifically use frequency sub-bands therein, for example, the L5 band centered at 1176.45 MHz, the L2 band centered at 1227.60 MHz, the L3 band centered at 1381.05 MHz, and the L1 band centered at 1575.42 MHz. Also the GPS satellite phased array antennas transmit right hand circularly polarized (RHCP) signals that are effective to reduce multipath interference.

Current GNSS phased array antennas provide location resolution for the receiver of about two meters. However, certain future applications could benefit by having a much higher resolution, such as 20 cm. Also, current GNSS phased array antennas have a number of other limitations. One phased array antenna radiating element for a GNSS includes helix radiating elements each having a diameter of about 5" and a height of about 24". However, such a helix antenna element design is sensitive to passive inter-modulation (PIM) and has a significant number of piece parts. Further, the helices are too long and have a significant phase center variation with frequency resulting in poor location accuracy on the ground. The helices also have low aperture efficiency and suffer from electrostatic discharge (ESD) issues that require metallization on dielectric supports used for the helix windings. These antennas require high-level beam-forming networks (BFN) to distribute the RF signals from amplifier among various elements with certain amplitude and phase distributions. The first coupler of the BFN limits the maximum power that can be transmitted by the antenna, and therefore has effective isotropic radiated power (EIRP) limitations.

Another known radiating element for a phased array antenna provided on a GNSS, particularly the Galileo positioning system, is a patch-excited cup (PEC) antenna element. However, those antenna elements typically have a narrow bandwidth, such as 15%, which limits the performance of the array antenna. Further, phased array antennas employing PEC antenna elements also require a beam forming network (BFN), which limits the output power that is able to be radiated from the array. Thus, improvements can be made to phased array antenna radiating elements to make them lighter, more integrated and with higher resolution.

BRIEF DESCRIPTION OF THE DRAWINGS

FIG. 3 is a broken-away isometric view of one of the STAIR elements separated from the phased array antenna;

FIG. 4 is a broken-away, cross-sectional type view of one of the STAIR elements separated from the phased array antenna showing input RF connections and interface to a triplexer module;

FIG. 5 is an isometric view of an integrated antenna element unit including one of the STAIR elements mounted to one side of a panel and the triplexer module mounted to an opposite side of the panel;

DETAILED DESCRIPTION OF THE EMBODIMENTS

The following discussion of the embodiments of the invention directed to a phased array antenna including STAIR antenna elements and integrated triplexer modules is merely exemplary in nature, and is in no way intended to limit the invention or its applications or uses. For example, the phased array antenna discussed herein has specific application for a GPS satellite. However, as will be appreciated by those skilled in the art, the phased array antenna may have application for other communications systems, including other satellite communications and navigation systems.

Figure 1:
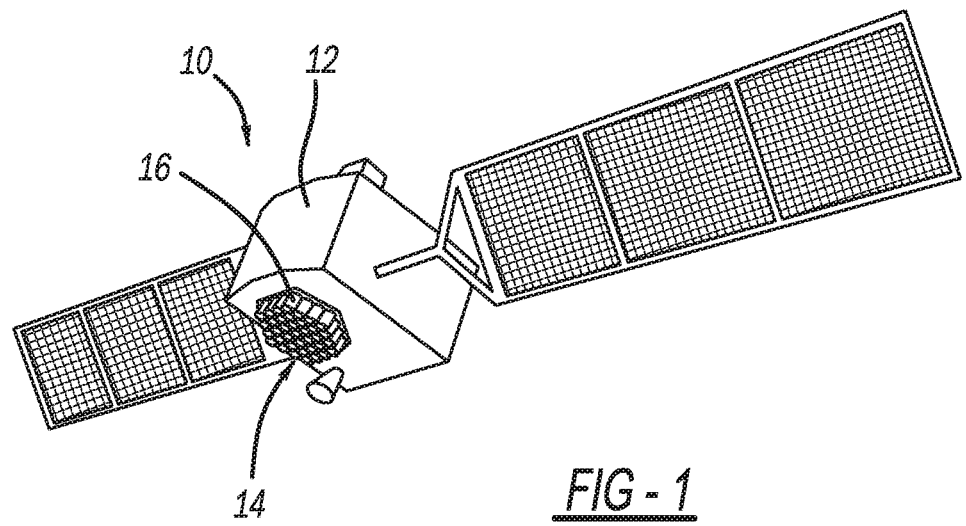
FIG. 1 is an isometric view of a GPS satellite including a phased array antenna having a plurality of step aperture integrated radiating (STAIR) antenna elements.
Figure 2:
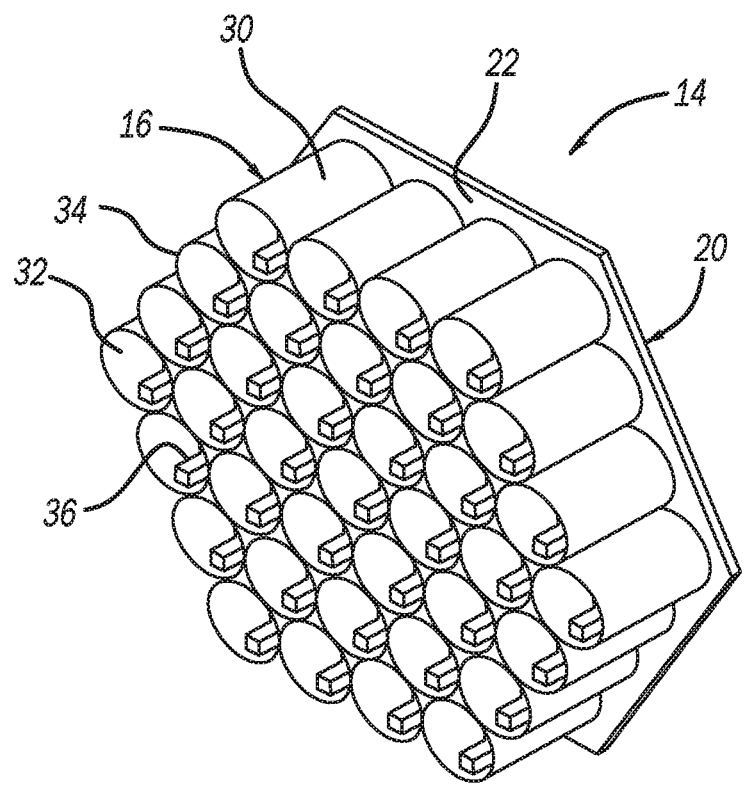
FIG. 2 is an isometric view of the phased array antenna shown in FIG. 1 separated from the satellite.

FIG. 1 is an isometric view of a GPS satellite 10 including a satellite body 12 and a phased array antenna 14 mounted thereto that is directed towards the Earth, where the antenna 14 includes a plurality of STAIR antenna elements 16. FIG. 2 is an isometric view of the phased array antenna 14 separated from the satellite 10 to better illustrate the configuration of the STAIR elements 16. In this non-limiting embodiment, the antenna 14 includes thirty-seven of the STAIR elements 16 arranged in a hexagonal pattern as shown to provide a number of advantages of the antenna 14 as discussed herein. In this non-limiting example, each of the elements 16 is mounted to a top surface 22 of a composite honeycomb panel 20 with a metalized kapton layer covering the honeycomb panel 20 that is configured to reduce satellite weight, where the panel 20 forms an RF ground-plane and/or a shorting back plate for the elements 16. The satellite 10 would be one of a plurality of satellites orbiting the Earth as a constellation at a suitable altitude, such as in a MEO, and provide GPS signals that can be received by a GPS receiver (not shown) on the Earth so as to allow a user of the receiver to know its exact position, as is well understood by those skilled in the art.

Each of the STAIR antenna elements 16 has a specific configuration discussed in detail below that allows the antenna 14 to operate with a high enough performance for the next generation GPS satellites, including compact size, low mass, a polarizing and radiating function in a compact configuration resulting in high aperture efficiency, low cross-polarization and a stable phase center. The antenna 14 has a wideband width of 31% covering the L1, L2 and L5 frequency bands, a high efficiency of 97% average over all of the L1, L2 and L5 frequency bands, a low on-axial ratio of less than 0.5 dB, and a return loss (RL) and isolation greater than 22 dB, a low PIM, for example, a second order PIM levels of −125 dBm at UHF bands, a high multipaction margin of greater than 14 dB, and a minimal phase center/group delay (PC/GD) variation with frequency, such as a PC variation of 0.18" maximum over the L1, L2 and L5 bands. In one embodiment, the preferred group delay variation is in the range of about 10 ns peak to peak to about 30 ns peak to peak. These specifications provide a number of advantages for the next generation GPS satellite payloads, such as better location accuracy on the ground due to lower group delay of the RF signals, on-board beam flexibility due to a digital BFN instead of a fixed RF BFN, distributed amplification, higher EIRP, and the ability to share power among various beams.

To achieve the above-mentioned parameters, the elements 16 employ a four-step septum polarizer that is operable to convert linearly polarized signals to circularly polarized signals, where the polarizer has a minimal gap between the last step of the septum and the element aperture in order to minimize phase center variation and simultaneously achieve high efficiency. It is noted that the number of steps is not limited to four and also could assume a smooth profile to mimic the steps. The elements 16 have an orthogonal port termination with matched load to minimize reflections going back into the far-field, thus achieving low cross-polarization performance. The elements 16 are integrated with triplexers having a high pressure TEM-line interface to minimize PIM levels. Each triplexer employs a four-pole combline filter for each of the L1 and L5 frequency bands and a five-pole filter for the L2 frequency band to achieve high isolation among the bands resulting in a compact configuration that can be directly mounted below the element 16 and within the available real-estate per element. The elements 16 also have a low pass iris filter to reject radio astronomy bands above 10 GHz. The integrated element 16 and triplexer has a very low insertion loss of less than 0.5 dB, and is suitable for the phased array antenna intended for next generation GPS payloads.

FIG. 3 is a broken-away isometric view and FIG. 4 is a broken-away cross-sectional view of one of the STAIR antenna elements 16 separated from the antenna 14 and being shown mounted to the panel 20 by bolts 28 as shown in FIG. 4. The element 16 includes an outer cylindrical waveguide 30 defining an inner chamber 32 therein and an element aperture 34 opposite to the panel 20. In this non-limiting embodiment, the waveguide 30 has a diameter in the range of 7 to 10 inches and a height in the range of 13 to 17 inches. A septum polarizer 36 is positioned within the chamber 32 and is mounted to the waveguide 32 by bolts 38 (see FIG. 5), where the polarizer 36 is a specially configured piece of conductive material. Because the antenna 14 is provided on the satellite 10, weight of the antenna 14 is a significant issue, the waveguide 30 and the polarizer 36 could include a number of small openings (not shown) so as to remove material to reduce the weight of the element 16, but not affect the electrical properties of the element 16. The STAIR elements 16 can be made of any suitable material. For example, the waveguide 30 can be a rolled sheet metal of an aluminum alloy or a round stock machined aluminum alloy block and have a thickness in the range 0.01-0.10 inches. Further, the preferred weight of each STAIR element 16 is in the range of 1-4 pounds.

As mentioned, the polarizer 36 operates to convert linearly polarized signals to RHCP signals suitable for GPS purposes in the L1, L2 and L5 frequency bands. A coaxial TNC connector 42 is coupled to a bottom surface 44 of the panel 20 opposite to the element 16 and receives a combined L1, L2 and L5 linearly polarized signal to be converted and transmitted, where the connector 42 extends through the panel 20. Another coaxial TNC connector 46 is coupled to the bottom surface 44 of the panel 20 opposite to the element 16 that transmits left hand circularly polarized (LHCP) signals through the polarizer 36 (if connected to triplexer), where the connector 46 extends through the panel 20, and where the connector 46 is terminated with a load 48 so as to reduce signal reflections and minimize unwanted cross-polarization and increasing the overall antenna performance. A center terminal 50 of the connector 42 is coupled to an RHCP ridge feed structure 52 mounted to one side of a septum feed structure 54 that forms part of the polarizer 36 and receives the linearly polarized signal to be converted to the RHCP signal. Likewise, a center terminal 58 of the connector 46 is coupled to an LHCP ridge feed structure 56 mounted to an opposite side of the septum feed structure 54, and receives the linearly polarized signal (if connected) to be converted to the LHCP signal, but is terminated with the matched load 48. The ridge feed structures 52 and 56 have a general stair-step shape in this non-limiting embodiment so as to provide a shape suitable for wideband signal propagation and the desired low weight requirements. Further, the septum polarizer 36 and the ridge feed structures 52 and 56 can be the same material and thickness as the outer waveguide 30.

The polarizer 36 includes four steps of differing heights, specifically a lower step 60 formed integral with the feed structure 54, a lower middle step 62, an upper middle step 64 and an upper step 66 proximate the aperture 34. Electrical signals from the feed structure 54 propagate in the polarizer 36 and transition from one step to a next step that create currents in the waveguide 30 that generate the circularly polarized signal emitted from the aperture 34 in a manner well understood by those skilled in the art. More specifically, as the signal propagates through the septum 36 vertical polarization is produced so that once the signal reaches the upper step 66, the combination of the vertical and horizontal polarizations creates a circularly polarized radiating signal. The conversion of linearly polarized signal to horizontal and vertically polarized signals and the distance between the top of the step 66 and the aperture 34 creates the rotating RHCP that is radiated from the element 16 and operates to minimize the phase variation in the far-field. Thus, this configuration of the element 16 provides the necessary high performance radiating signal to obtain the desired resolution resulting in improved location accuracy on the ground by using a compact and integrated configuration.

Figure 6:
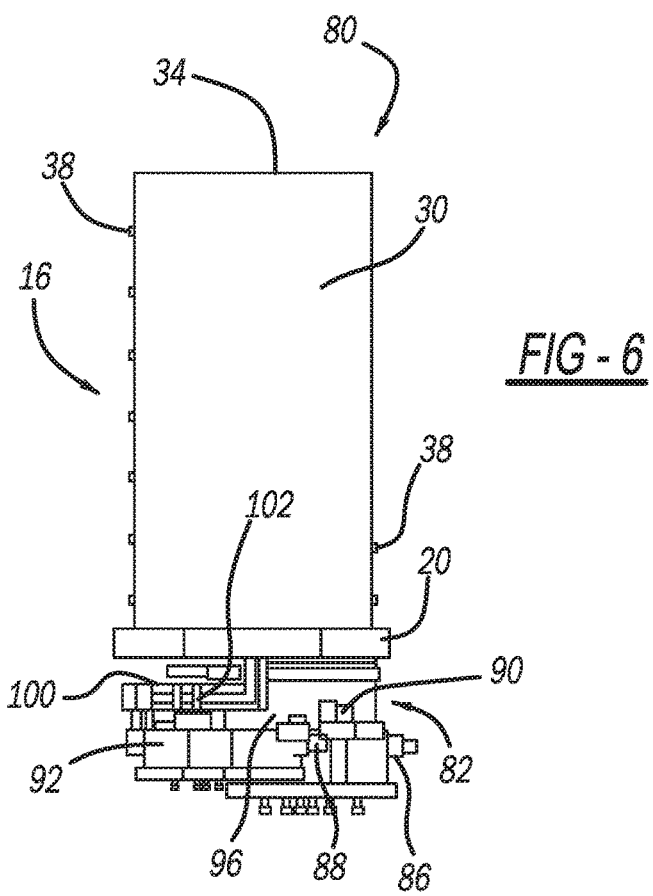
FIG. 6 is a side view of the integrated antenna element unit shown in FIG. 5.
Figure 7:
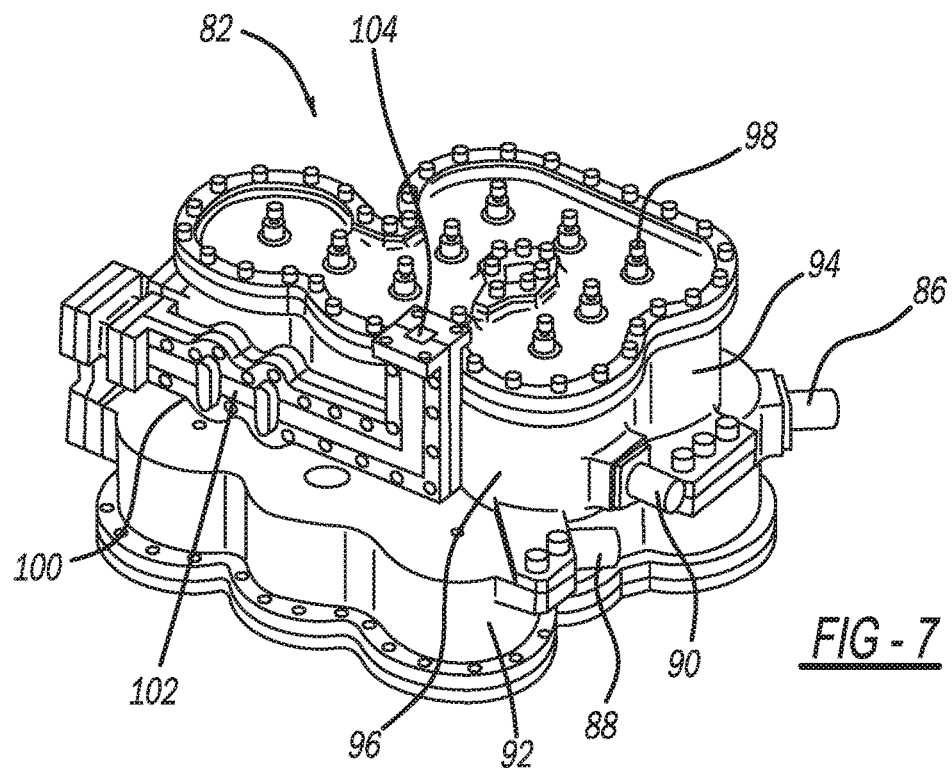
FIG. 7 is an isometric view of the triplexer module separated from the integrated antenna element unit shown in FIG. 5.

FIG. 5 is an isometric view and FIG. 6 is a side view of an integrated antenna element unit 80 including one of the elements 16 coupled to the panel 20 and a triplexer module 82 mounted to the bottom surface 44 of the panel 20. FIG. 7 is an isometric view of the triplexer module 82 separated from the unit 80. The triplexer module 82 receives the three separate L1, L2 and L5 frequency band signals at TNC connectors 86, 88 and 90, respectively. The triplexer module 82 includes three bandpass combline filters corresponding to each of the L1, L2 and L5 frequency bands. In the module 82 the combline filters are stacked in two layers, where a first combline filter 92 is provided at a lower layer of the module 82 and includes four resonating cavities that pass the L1 frequency band signal provided to the connector 86 and reject the L2 and L5 bands. A second combline filter 94 is provided in the upper layer, and includes five resonating cavities that pass the L2 frequency band signal provided to the connector 88 while rejecting the L1 and L3 bands. A third combline filter 96 is provided in the upper layer, and includes four resonating cavities that pass the L5 frequency band signal provided at the connector 90 and reject the L1 and L2 bands. A separate tuning screw 98 is provided for each of the cavities in the filters 92, 94 and 96.

As will be further discussed, the triplexer module 82 combines the bandpass filtered L1, L2 and L5 frequency bands into a single combined wideband signal that is then provided to a waveguide 100 that includes a notch filter 102 that only passes the combined frequency band of interest and rejects unwanted high frequency RF signals. An output port 104 of the waveguide 100 is coupled to the connector 42 to provide the combined linearly polarized signal to the feed structure 52 to be converted to an RHCP signal as discussed above.

Figure 8:
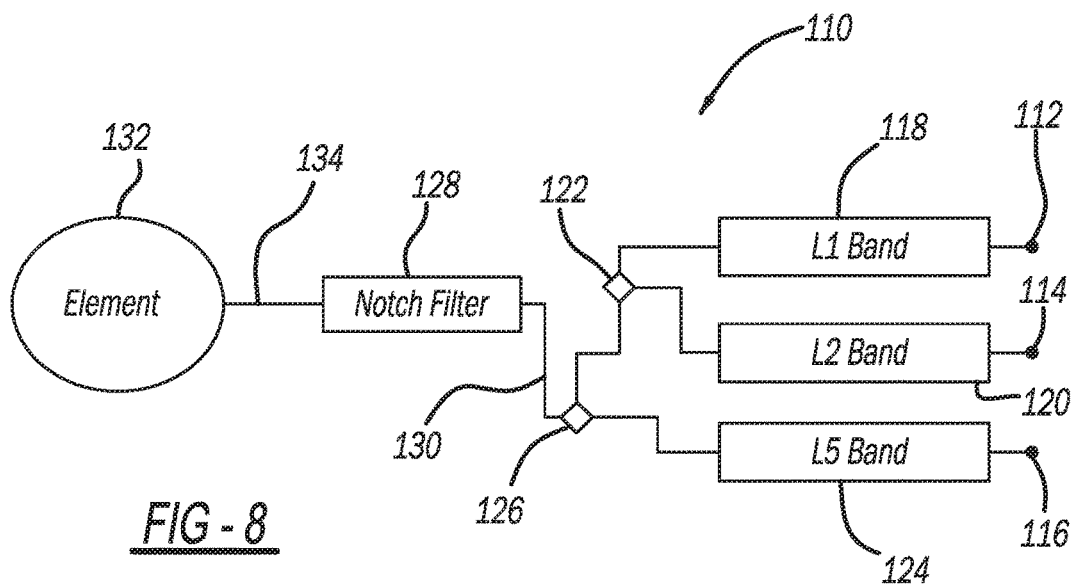
FIG. 8 is a schematic block diagram of the radiating element integrated with the triplexer module.

FIG. 8 is a schematic block diagram 110 representation of the integrated antenna element unit 80, where the L1 frequency band signal is provided at input port 112, the L2 frequency band signal is provided at input port 114 and the L5 frequency band signal is provided at input port 116. The L1 frequency band signal is filtered by a bandpass filter 118 and the L2 frequency band signal is filtered by a bandpass filter 120, where the filtered L1 and L2 signals are combined at junction 122. The L5 frequency band signal is filtered by a bandpass filter 124 and the filtered L5 frequency band signal is combined with the combined L1 and L2 frequency band signals at junction 126. The combined L1, L2 and L5 frequency band signals are then sent to a notch filter 128 on a low PIM transverse electric and magnetic (TEM) line 130 to filter out frequencies outside of the L1, L2 and L5 frequency bands, and the filtered signal from the notch filter 128 is provided to a radiating element 132 on a low PIM TEM line 134.

Figure 9:
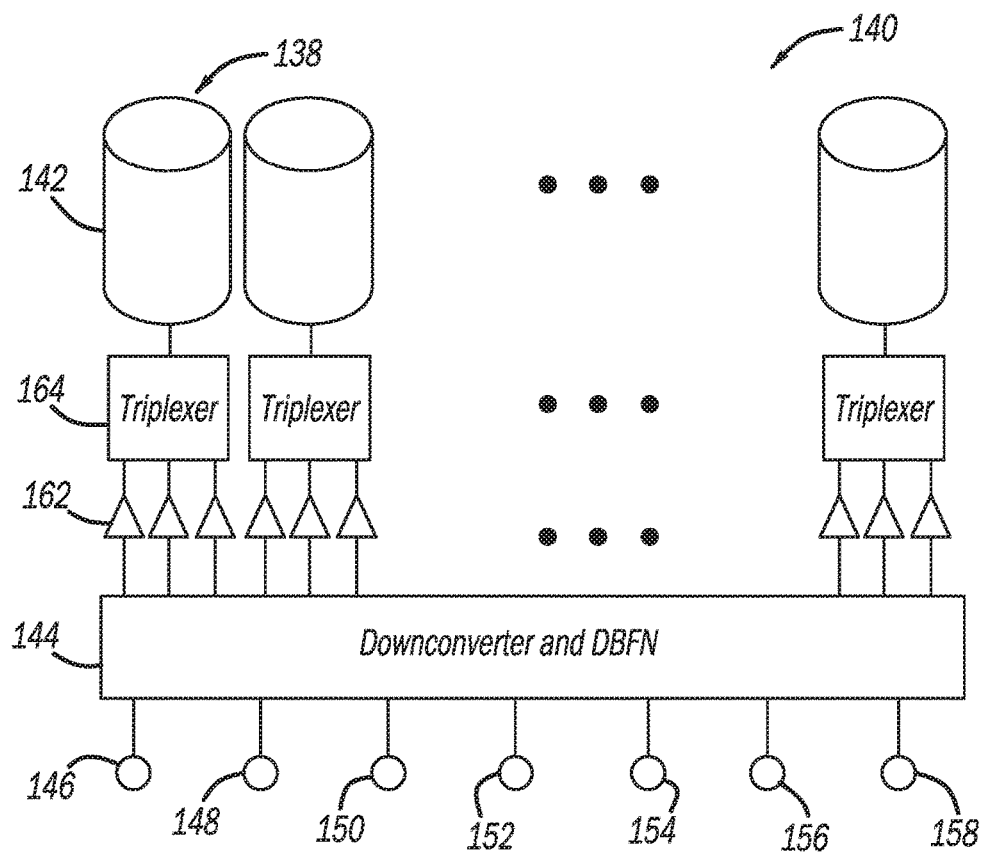
FIG. 9 is a schematic block diagram of a phased array antenna.

FIG. 9 is a schematic block diagram of a phased array antenna 140 of the type discussed above, where the thirty-seven elements 16 are represented by radiating elements 142, where each radiating element 142 is provided in a separate array channel 138. A down-converter and digital beam forming network (DBFN) 144 receives seven input signals including a first earth coverage (EC) L1 frequency band signal at port 146, a second EC L1 frequency band signal at port 148, an L1 frequency band spot beam at port 150, a first EC L2 frequency band signal at port 152, a second EC L2 frequency band signal at port 154, a L2 frequency band spot beam at port 156 and an EC L5 frequency band signal at port 158. The DBFN 144 multiplexes and combines the signals in a manner well understood in the art and provides each of the L1, L2 and L5 frequency band signals to a separate solid state power amplifier (SSPA) 162 in each channel 138 to amplify the signals before they are sent to a triplexer 164 that combines the signals in the manner discussed above to be provided to each of the radiating elements 142.

Figure 10:
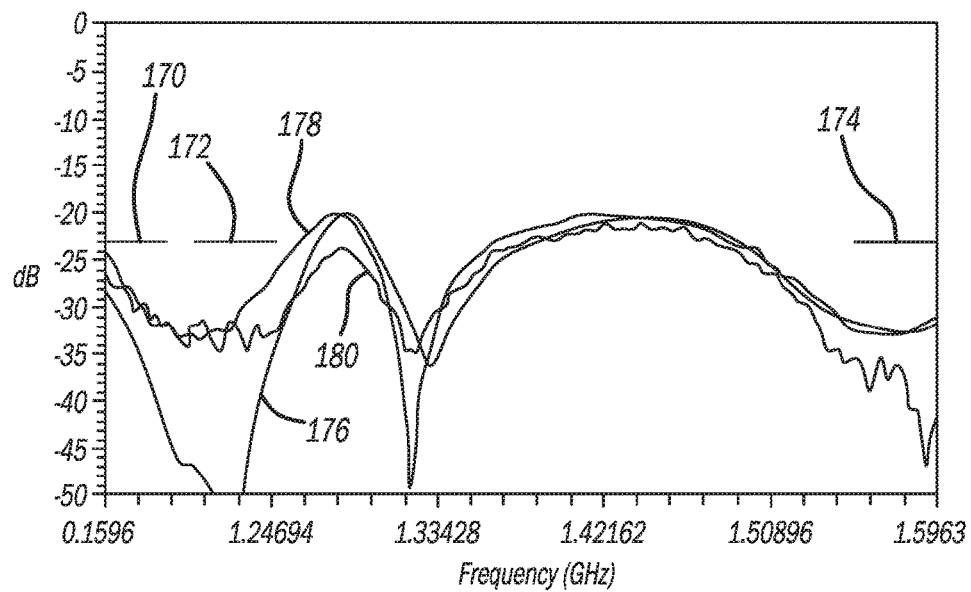
FIG. 10 is a graph with frequency on the horizontal axis and return loss on the vertical axis showing a measured return loss of one of the STAIR antenna elements.

FIG. 10 is a graph with frequency on the horizontal axis and return loss in dB on the vertical axis showing the performance of the phased array antenna 14, where lines 170, 172 and 174 represent the L1, L2 and L5 frequency bands, respectively. Line 176 is the simulated return loss of the element 16, line 178 is the measured return loss for a single one of the element 16, and line 180 is the measured return loss of the central radiating element in the antenna 14.

Figure 11:
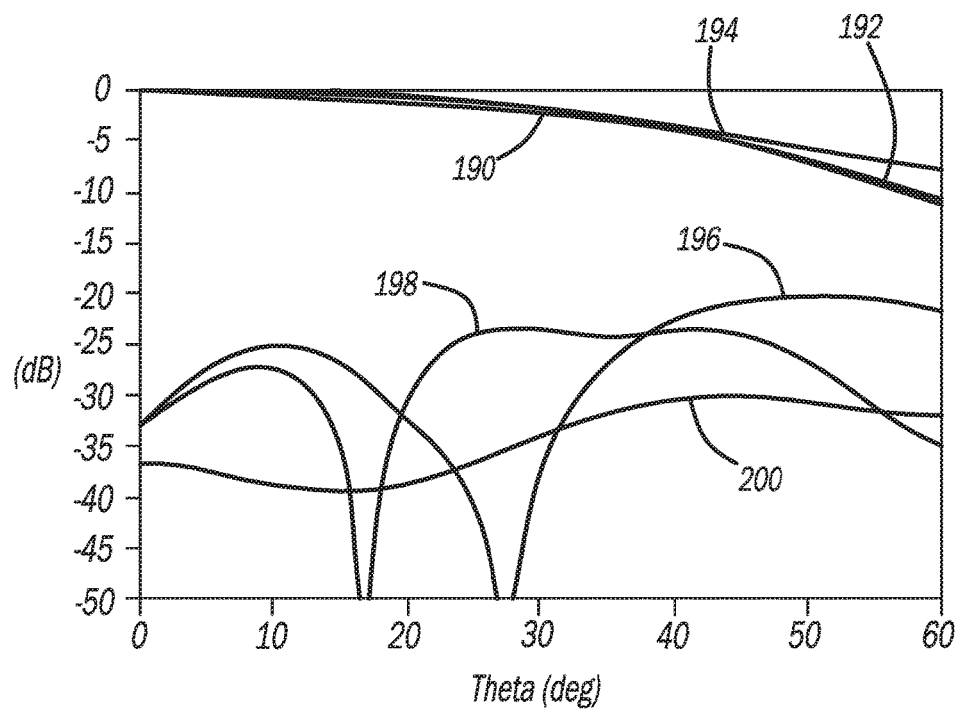
FIG. 11 is a graph with degrees on the horizontal axis and power on the vertical axis showing typical radiation patterns in the L5 frequency band.

FIG. 11 is a graph with degrees on the horizontal axis and power on the vertical axis showing typical radiation patterns at 1.1596 GHz in the L5 frequency band. Graph line 190 is a co-polar RHCP radiation pattern for a seven element antenna, graph line 192 is a co-polar RHCP radiation pattern for a single element antenna, graph line 194 is a co-polar simulated RHCP radiation pattern for a single element antenna, graph line 196 is a cross-polar LHCP radiation pattern for a seven element antenna, graph line 198 is a cross-polar LHCP radiation pattern for a single element antenna, and graph line 200 is a cross-polar simulated LHCP radiation pattern for a single element antenna.

Table 1 below identifies some of the performance characteristics for each of the L1, L2 and L5 frequency bands.

TABLE 1

| Freq, MHz | Theoretical Directivity, dBi, (100% Hex Area) | Measured Directivity Single Element | Measured Directivity Septet Array/ Efficiency (η) | Phase Center (Location Relative to Aperture) |
|---|---|---|---|---|
| 1555 | 10.82 | 10.31 | 1062 (95%) | −0.06" |
| 1207 | 9.65 | 8.85 | 9.52 (97.0%) | +0.11" |
| 1160 | 9.58 | 8.82 | 9.48 (97.7%) | −0.07" |

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A phased array antenna including a plurality of antenna element units mounted to a single panel having a first side and a second side, each antenna element unit comprising:

a step aperture integrated radiating (STAIR) antenna element mounted to the first side of the panel and including an outer cylindrical waveguide having a chamber and an aperture opening opposite to the panel, a septum polarizer including a plurality of steps and a septum feed structure configured within the chamber, and a right hand circularly polarized (RHCP) ridge feed structure mounted to the first side of the panel and being electrically coupled to the septum feed structure; and a triplexer module mounted to the second side of the panel and being responsive to a plurality of linearly polarized signals to be transmitted by the STAIR element, said triplexer module operating to combine the plurality of linearly polarized signals and provide the combined signal to the RHCP feed structure, said septum polarizer converting the combined linearly polarized signal to a circularly polarized signal for transmission from the aperture opening.

2. The phased array antenna according to claim 1 wherein the plurality of linearly polarized signals include a first signal at the L1 frequency band, a second signal at the L2 frequency band and a third signal at the L5 frequency band.

3. The phased array antenna according to claim 1 wherein the triplexer module includes a notch filter for filtering the combined signal.

4. The phased array antenna according to claim 1 wherein the triplexer module includes a separate combline bandpass filter for each frequency band of the plurality of linearly polarized signals.

5. The phased array antenna according to claim 4 wherein each combline bandpass filter includes a plurality of filtering cavities.

6. The phased array antenna according to claim 1 wherein the triplexer module employs low passive inter-modulation (PIM) transverse electric and magnetic (TEM) line connections.

7. The phased array antenna according to claim 1 wherein the antenna is mounted to a global positioning system (GPS) satellite.

8. The phased array antenna according to claim 7 wherein the antenna provides earth coverage and spot beams from a medium earth orbit (MEO) with group-delay variations ranging from about 10 ns peak to peak to about 30 ns peak to peak and high power handling for the GPS satellite with improved location accuracies and a higher effective isotropic radiated power (EIRP) value.

9. The phased array antenna according to claim 1 wherein the panel is a hexagonal shaped panel.

10. The phased array antenna according to claim 1 wherein the panel is a honeycomb panel.

11. The phased array antenna according to claim 1 wherein the cylindrical waveguide has a diameter in the range of 7 to 10 inches and a height in the range of 13 to 17 inches.

12. The phased array antenna according to claim 1 wherein the plurality of steps is four steps.

13. The phased array antenna according to claim 1 wherein the cylindrical waveguide and the septum polarizer are configured to reduce the weight of the antenna element.

14. The phased array antenna according to claim 1 wherein the plurality of antenna elements is thirty-seven antenna elements.

15. The phased array antenna according to claim 1 wherein the STAIR antenna element includes a left hand circularly polarize (LHCP) feed structure mounted to the first side of the panel and configured within the chamber and being electrically coupled to an opposite side of the septum feed structure from the RHCP feed structure.

16. The phased array antenna according to claim 1 wherein each radiating element has an inner geometry designed to minimize a phase center variation to less than 0.2" over the L1, L2 and L5 frequency bands resulting in improved location accuracy on ground and high aperture efficiency values of greater than 95%.

17. A phased array antenna for a GPS satellite, said phased array antenna including a plurality of antenna element units mounted to a single panel having a first side and a second side, each antenna element unit comprising:
a step aperture integrated radiating (STAIR) element mounted to the first side of the panel and including an outer cylindrical waveguide having a chamber and an aperture opening opposite to the panel, a septum polarizer including four steps configured within the chamber and a septum feed structure mounted to the first side of the panel and configured within the chamber, and a right hand circularly polarized (RHCP) feed structure mounted to the first side of the panel and being electrically coupled to the septum feed structure; and
a triplexer module mounted to the second side of the panel and being responsive to linearly polarized signals in the L1 frequency band, the L2 frequency band and the L5 frequency band to be transmitted by the STAIR element, said triplexer module including a separate bandpass filter for filtering each of the L1 frequency band signal, the L2 frequency band signal and the L5 frequency band signal, said triplexer module operating to combine the filtered L1, L2 and L5 frequency band signals and provide the combined signal to the RHCP feed structure, said septum polarizer converting the combined linearly polarized signal to a circularly polarized signal for transmission from the aperture opening.

18. The phased array antenna according to claim 17 wherein the triplexer module employs low passive inter-modulation (PIM) transverse electric and magnetic (TEM) line connections.

19. The phased array antenna according to claim 17 wherein the cylindrical waveguide has a diameter in the range of 7 to 10 inches and a height in the range of 13 to 17 inches.

20. The phased array antenna according to claim 17 wherein the plurality of antenna elements is thirty-seven antenna elements.

21. A phased array antenna comprising:
a step aperture integrated radiating (STAIR) antenna element configured to convert linearly polarized signals to circularly polarized signals, said STAIR antenna element including an outer cylindrical housing, an internal septum configured to divide the linearly polarized signals into two orthogonal components that are phase shifted by 90°, and a linear signal converter configured to convert transverse electric and magnetic signals into a linearly polarized waveguide signal; and
a triplexer module configured to combine a plurality of linearly polarized signals and provide the combined signals to the linear signal converter.

22. The phased array antenna according to claim 21 wherein the STAIR antenna element is one of a plurality of STAIR antenna elements mounted to a common panel.

23. The phased array antenna according to claim 21 wherein the STAIR antenna element is configured to provide a signal phase center variation less than about 0.2 inches over an L1, L2 and L5 frequency band.

* * * * *